(12) United States Patent
Wakayama

(10) Patent No.: US 8,188,705 B2
(45) Date of Patent: May 29, 2012

(54) CHARGE METHOD AND DEVICE OF BATTERY FOR ELECTRIC MOTOR VEHICLE

(75) Inventor: Norihira Wakayama, Hiroshima (JP)

(73) Assignee: Mazda Motor Corporation (JP)

(*) Notice: Subject to any disclaimer, the term of this patent is extended or adjusted under 35 U.S.C. 154(b) by 402 days.

(21) Appl. No.: 12/582,096

(22) Filed: Oct. 20, 2009

(65) Prior Publication Data

US 2010/0097036 A1 Apr. 22, 2010

(30) Foreign Application Priority Data

Oct. 20, 2008 (JP) ................................ 2008-269339

(51) Int. Cl.
*H02J 7/14* (2006.01)
(52) U.S. Cl. .................... 320/104; 320/109; 320/157
(58) Field of Classification Search .................. 320/104, 320/109, 134, 153, 157; 324/427
See application file for complete search history.

(56) References Cited

U.S. PATENT DOCUMENTS

| | | | |
|---|---|---|---|
| 5,736,834 A | 4/1998 | Kuno | |
| 6,107,782 A * | 8/2000 | Imai et al. | 320/150 |
| 2009/0021218 A1 * | 1/2009 | Kelty et al. | 320/137 |

FOREIGN PATENT DOCUMENTS

| | | |
|---|---|---|
| JP | 07-111736 | 4/1995 |
| JP | H08-098420 A | 4/1996 |
| JP | H09-168240 A | 6/1997 |

* cited by examiner

*Primary Examiner* — Edward Tso
*Assistant Examiner* — Aaron Piggush
(74) *Attorney, Agent, or Firm* — Studebaker & Brackett PC; Donald R. Studebaker

(57) ABSTRACT

The present invention is a charge method of a battery for an electric motor vehicle, in which a battery is charged by an outside electric source. A residual charge quantity of the battery is detected before charging. A maximum-quantity charge time Ttotal which is required for the residual charge quantity of the battery becoming the maximum quantity is calculated based on detection result. A driving-start time tds of the electric motor vehicle is estimated. A first charge is executed so as to be started from a driving stop of the electric motor vehicle, continued for a period of time which is shorter than the maximum-quantity charge time Ttotal, and completed before the driving-start time tds. A second charge is executed so as to be started after the first charge is completed and completed at the driving-start time tds.

16 Claims, 9 Drawing Sheets

CHARGE METHOD AND DEVICE OF BATTERY FOR ELECTRIC MOTOR VEHICLE

BACKGROUND OF THE INVENTION

The present invention relates to a charge method of a battery for an electric motor vehicle and a charge device of a battery for an electric motor vehicle.

In these days, electric motor vehicles which are driven by an electric motor receiving an electric power supplied from a battery have become noticeable. In these electric motor vehicles, it may be necessary that the battery is charged by an outside electric source when a residual charge quantity of the battery becomes small. However, the number of the electric motor vehicles spreading is still small, so there are not sufficiently many places where the outside electric source is located. Accordingly, there is a concern that the charging of the battery by the outside electric source could not be necessarily conducted properly when the residual charge quantity of the battery becomes small and the charging becomes necessary. Therefore, it should be necessary that the battery has been charged sufficiently during the vehicle's driving stop.

Meanwhile, there is a concern that the motor of the electric motor vehicle could not be started properly in a cold season unless the battery is warmed up, so that the vehicle's driving would not be started promptly. This is because of the battery's characteristics, in which the output voltage decreases depending on the decrease of the surrounding temperature of the battery, so that the sufficient electric power may not be supplied to the motor.

Japanese Patent Laid-Open Publication No. 7-111736 discloses the charge device of the battery, which may be one of countermeasures against the above-described concern, in which the battery charging has been so properly conducted during the vehicle's driving stop that the battery can be warmed up sufficiently (to a proper temperature) at the start of the vehicle's driving. That is, according to this charge device, the timer for setting a driving-start time of the vehicle is provided, and the time for starting the charge of the battery is calculated based on this set driving-start time so that the battery charging can be completed at the driving-start time of the vehicle. Thus, the battery charging is automatically started when the time has come to this calculated time for starting the charging of the battery after the vehicle's driving stop, and this battery charging is completed when the vehicle's driving is started again. Thereby, the battery has been warmed up sufficiently at the timing of the vehicle's driving start even in the cold season, thereby enabling the prompt vehicle's driving start.

However, the charging of the battery by the charge device of the above-described patent publication is started from a charge start time which is calculated based on the driving-start time of the vehicle. That is, no charging is conducted during a period from the vehicle's driving stop to this charge start time. Accordingly, in case the residual charge quantity of the battery is small when the vehicle's driving is stopped, if a driver wants to drive the vehicle before the charge start time, the motor may not operate. Or, even if the motor may operate, the residual charge quantity of the battery may not be sufficient, so that the vehicle may not be driven for a sufficiently long period.

SUMMARY OF THE INVENTION

An object of the present invention is to provide a charge method of a battery for an electric motor vehicle and a charge device of a battery for an electric motor vehicle which can complete the warm-up of the battery by the estimated driving-start time so that the vehicle driving can be started promptly even in the cold season and ensure the vehicle's driving start and the subsequent long driving in case the driver wants an unscheduled driving before the above-described estimated driving-start time.

According to the present invention, there is provided a charge method of a battery for an electric motor vehicle, in which a battery is charged by an outside electric source, comprising a residual charge quantity detecting step for detecting a residual charge quantity of the battery before charging, a maximum-quantity charge time calculating step for calculating a maximum-quantity charge time which is required for the residual charge quantity of the battery becoming the maximum quantity based on detection result of the residual charge quantity detecting step, a driving-start time estimating step for estimating a driving-start time of the electric motor vehicle, a first charge step for executing a first charge in which the charge of the battery is started from a driving stop of the electric motor vehicle, continued for a specified period of charge time which is shorter than the maximum-quantity charge time calculated by the maximum-quantity charge time calculating step, and completed before the driving-start time of the electric motor vehicle estimated by the driving-start time estimating step, and a second charge step for executing a second charge in which the charge of the battery is started after the first charge step is completed and completed at the driving-start time of the electric motor vehicle estimated by the driving-start time estimating step.

According to the present invention, the warm-up of the battery of the electric motor vehicle can be completed (the temperature of the battery can be increased up to the proper temperature) by the estimated (scheduled) driving-start time, so that the vehicle driving can be started promptly even in the cold season. Further, in case the driver wants the unscheduled driving before the above-described driving-start time, the battery may keep its sufficient residual charge quantity, so that the vehicle's driving start and the subsequent long driving can be ensured.

According to an embodiment of the present invention, the charge method further comprises a temperature estimating step for estimating a temperature at the driving-start time of the electric motor vehicle estimated by the driving-start time estimating step, and a warm-up time calculating step for calculating a warm-up time for the battery based on estimation result of the temperature estimating step, wherein the second charge step is executed for a period of the warm-up time calculated by the warm-up time calculating step. Thereby, since the warm-up of the battery is conducted depending on the temperature at the driving-start time, the temperature of the battery at the vehicle's driving start time can be warmed up to the proper temperature.

According to another embodiment of the present invention, the specified period of charge time of the first charge which is executed by the first charge step is a specified charge time which is required for the residual charge quantity of the battery becoming a specified quantity. Thereby, in case the unscheduled driving start is conducted before the estimated driving-start time, the driving for a period of time which corresponds to the specified charge time of the battery can be ensured.

According to another embodiment of the present invention, in case a total of respective charge times of the first and second charges which are executed by the first and second charge steps exceeds the maximum-quantity charge time calculated by the maximum-quantity charge time calculating step, the period of charge time of the first charge which is executed by the first charge step is shortened such that the total of the charge times of the first and second charges is equal to the maximum-quantity charge time calculated by the maximum-quantity charge time calculating step. Thereby, the second charge is executed for the period of the warm-up time, so that the temperature of the battery at the vehicle's driving start time can be warmed up to the proper temperature. Further, an improper excessive charge of the battery can be prevented.

According to another embodiment of the present invention, in case a total of respective charge times of the first and second charges which are executed by the first and second charge steps exceeds the maximum-quantity charge time calculated by the maximum-quantity charge time calculating step, the period of charge time of the second charge which is executed by the second charge step is shortened such that the total of the charge times of the first and second charges is equal to the maximum-quantity charge time calculated by the maximum-quantity charge time calculating step. Thereby, the first charge is executed for the period of the specified charge time, so that in case the unscheduled driving start is conducted before the estimated driving-start time, the driving for the period of time which corresponds to the specified charge time of the battery can be ensured. Further, the improper excessive charge of the battery can be prevented.

According to another embodiment of the present invention, in case a total of respective charge times of the first and second charges which are executed by the first and second charge steps does not exceed the maximum-quantity charge time calculated by the maximum-quantity charge time calculating step, the period of charge time of the first charge which is executed by the first charge step is extended such that the total of the charge times of the first and second charges is equal to the maximum-quantity charge time calculated by the maximum-quantity charge time calculating step. Thereby, in case the vehicle's driving is conducted on schedule at the estimated driving-start time, the driving of the vehicle can be started with the maximum residual battery quantity or with a specified quantity which is close to the maximum quantity. Accordingly, the properly-long driving can be provided. Meanwhile, in case the unscheduled driving is conducted before the estimated driving-start time, the first charge is extended, so that the properly-long driving can be provided.

According to another embodiment of the present invention, in case a total of respective charge times of the first and second charges which are executed by the first and second charge steps does not exceed the maximum-quantity charge time calculated by the maximum-quantity charge time calculating step, the period of charge time of the second charge which is executed by the second charge step is extended such that the total of the charge times of the first and second charges is equal to the maximum-quantity charge time calculated by the maximum-quantity charge time calculating step. Thereby, in case the vehicle's driving is conducted on schedule at the estimated driving-start time, the driving of the vehicle can be started with the maximum residual battery quantity or with a specified quantity which is close to the maximum quantity. Accordingly, the sufficiently-long driving can be provided. Further, the start of the second charge is quickened, so that the battery's temperature can be increased to the proper temperature earlier. Accordingly, the prompt start of the vehicle's driving can be provided even if the driving start is slightly earlier than the estimated driving-start time.

According to another embodiment of the present invention, the charge method further comprises a third charge step for executing a third charge in which the charge of the battery is conducted for a specified period of charge time in case a total of respective charge times of the first and second charges which are executed by the first and second charge steps does not exceed the maximum-quantity charge time calculated by the maximum-quantity charge time calculating step, wherein the third charge step is conducted after the first charge step and before the second charge step such that the charge time of the third charge is equivalent to a difference between the total of the charge times of the first and second charges and the maximum-quantity charge time. Thereby, even in case the unscheduled driving start is conducted between the completion time of the first charge and the start time of the second charge, the battery is warmed up by the third charge, so that the prompt driving start can be ensured.

Further, according to another aspect of the present invention, there is provided a charge device of a battery for an electric motor vehicle, comprising a battery to be charged by an outside electric source and supply an electric power to a motor for driving the vehicle, a residual charge quantity detecting means for detecting a residual charge quantity of the battery before charging, and a charge control means for controlling charging of the battery, wherein the charge control means calculates a maximum-quantity charge time which is required for the residual charge quantity of the battery becoming the maximum quantity based on detection result of the residual charge quantity detecting means, estimates a driving-start time of the electric motor vehicle, executes a first charge in which the charge of the battery is started from a driving stop of the electric motor vehicle, continued for a specified period of charge time which is shorter than the maximum-quantity charge time, and completed before the driving-start time of the electric motor vehicle, and executes a second charge in which the charge of the battery is started after the first charge is completed and completed at the driving-start time of the electric motor vehicle. The charge device of the present invention can provide substantially the same functions and advantages as those of the above-described charge method.

Other features, aspects, and advantages of the present invention will become apparent from the following descriptions which refer to the accompanying drawings.

DETAILED DESCRIPTION OF THE INVENTION

Figure 1:
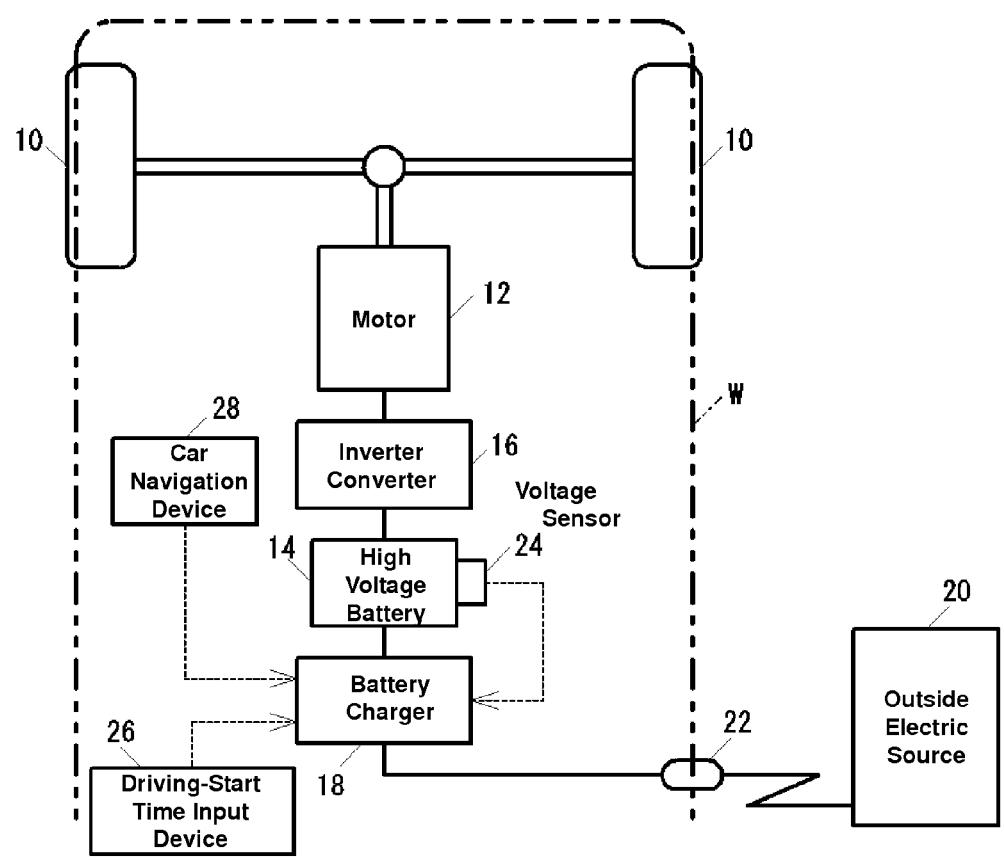
FIG. 1 is a diagram schematically showing constitution of an electric motor vehicle according to the present invention.

Hereinafter, preferred embodiments of the present invention will be described referring to the drawings.

EMBODIMENT 1

FIG. 1 is a diagram schematically showing constitution of an electric motor vehicle W which executes a charge method of a battery for the electric motor vehicle according to a first embodiment of the present invention.

As shown in FIG. 1, the electric motor vehicle W is a vehicle in which wheels 10 are driven by a motor 12, and installs a high-voltage battery 14 to supply an electric power to the motor 12 therein. The motor 12 is coupled to the battery 14 via an inverter converter 16. The inverter converter 16 supplies the electric power to the motor 12 with conversion of the direct current from the battery 14 to the alternating current, and also supplies the electric power to the battery 14 with conversion of the alternating current which is generated by the motor 12, which functions as a generator during a vehicle deceleration, to the alternating current.

The battery 14 is charged not only by the motor 12 which functions as the generator but by a battery charger 18. The battery charger 18 charges the battery 14 with the electric power supplied from an outside electric source 20 which is located outside the electric motor vehicle W when the electric motor vehicle W stops. The battery charger 18 and the outside electric source 20 are connected to each other via a detachable connector 22.

The battery charger 18 is configured to calculate (detect) a residual charge quantity (a state of charge: SOC) of the battery 14 based on a signal from a voltage sensor 24 which detects the voltage of the battery 14 and to charge the battery 14 based on this calculated SOC. That is, the voltage sensor 24 functions as a residual charge quantity detecting means of the battery 14.

Further, the battery charger 18 is configured to charge the battery 14 based on driving-start time data from a driving-start time input device 26 and temperature data from a car navigation device 28, which will be described specifically below.

The driving-start time input device 26, to which a driver of the electric motor vehicle W inputs a driving-start time by means of a bottom or the like, supplies data of the inputted driving-start time to the battery charger 18.

The car navigation device 28 is a device to indicate a rout to the destination from the current location which is inputted by the driver by means of the button or the like. In particular, the car navigation device 28 of the present invention obtains temperature information through the internet, for example, and indicates the temperature at the destination as well as the route to the destination, and supplies the temperature data at a location point where the electric motor vehicle W stops to the battery charger 18.

Hereinafter, the charge of the battery 14 which is conducted by the battery charger 18 based on the signal from the voltage sensor 24, the driving-start time data from the driving-start time input device 26, and the temperature data from the car navigation device 28 will be described.

Figure 2A:
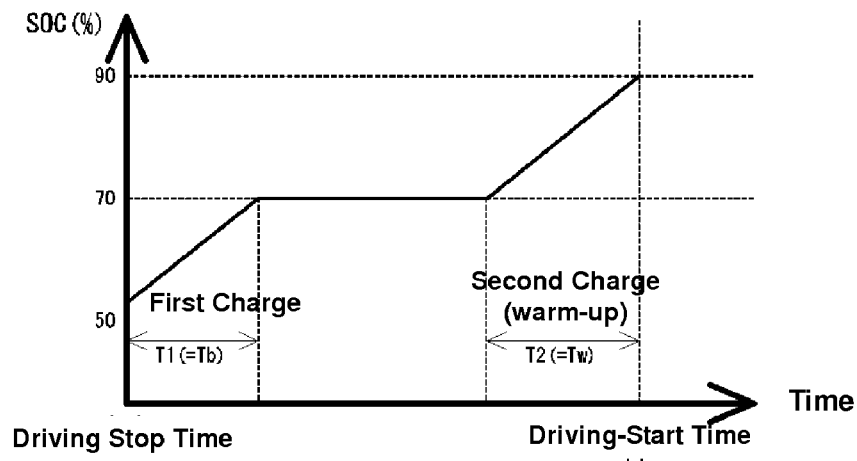
FIGS. 2A, 2B are graphs explaining a charge method of a battery for the electric motor vehicle according to the present invention.

FIG. 2A shows change of SOC of the battery 14 which is charged by the battery charger 18 when the electric motor vehicle W stops, that is, the battery charger 18 is connected to the outside electric source 20.

As shown in FIG. 2A, the battery charger 18 conducts the charge of the battery 14 not continuously but separately as a first charge and a second charge. Herein, the second charge which is conducted later is executed for a warm-up of the battery 14 in the cold season so that the vehicle driving can be started promptly at the driving-start time.

Figure 2B:
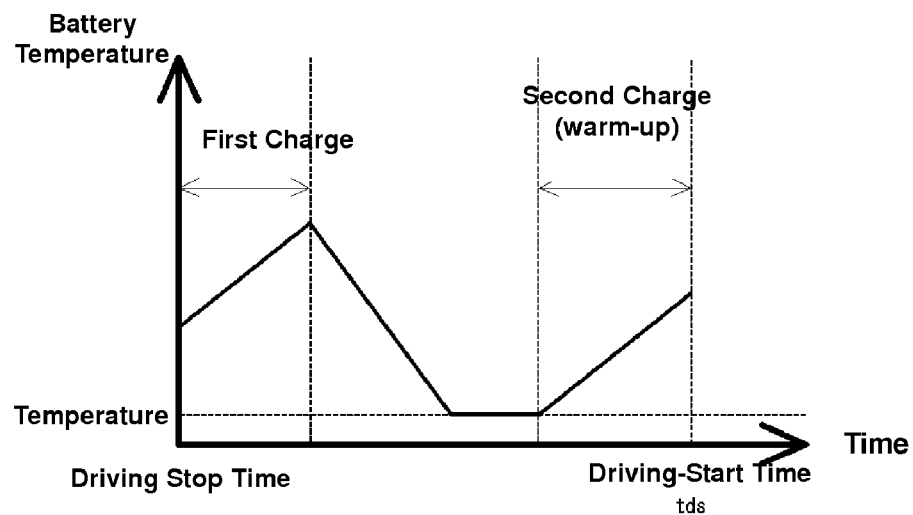

As shown in FIG. 2B, the temperature of the battery 14 increases during charging and decreases to an outside temperature during a non-charging. Accordingly, there is a concern that the motor 12 could not be started until the warm-up in the cold season if the temperature of the battery 14 has reduced to the outside temperature, so that the prompt vehicle-driving start could not be achieved. Herein, in order to cope with the above-described concern, the second charge which is to be completed at the driving-start time is executed so that the warm-up of the battery can be achieved.

Figure 3:
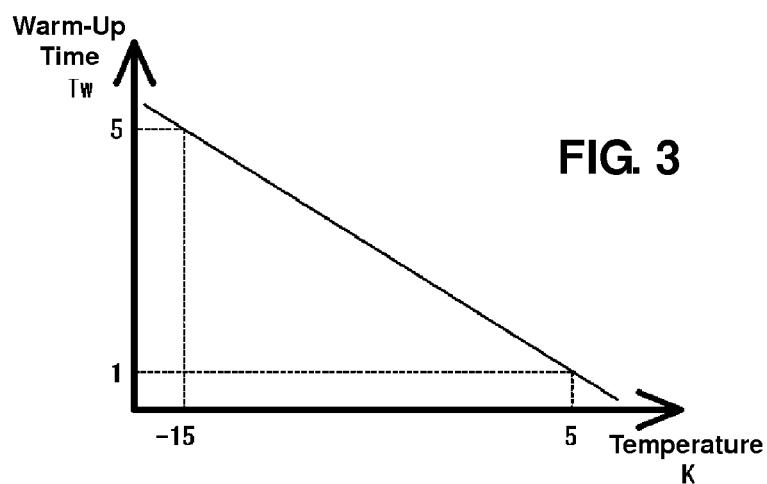
FIG. 3 is a graph showing a map of a relationship of a temperature and a warm-up time of the battery.

A relationship of the temperature and the warm-up time which is required for the sufficient warm-up of the battery 14 (the charge time of the second charge) at this temperature are previously obtained as a map shown in FIG. 3. As shown in this map, the required warm-up time becomes longer depending on the decrease of the temperature. The battery charge 18 calculates the warm-up time of the battery 14 (the charge time of the second charge) based on this map and the temperature data from the car navigation device 28. Then, the start time of the second charge is set to a timing point which is earlier than (advanced from) the vehicle-driving start time by the above-described warm-up time.

Meanwhile, the early first charge is the one for preparing for a case in which an unscheduled vehicle-driving start is required before the scheduled driving-start time. Executing this first charge ensures the start of the unscheduled driving and the subsequent long driving.

Specifically, the first charge is executed from the driving-start time only for a period of time which is required for the residual charge quantity of the battery 14 becoming a specified quantity (SOC 70% of FIGS. 2A, 2B) (which corresponds to a "specified charge time" in the claims of the present invention). The specified quantity is set to be shorter than the maximum quantity of the battery 14 (which is not a physical maximum quantity but an upper limit quantity of the battery which may be determined considering the battery's durability, function and so on; SOC 90% in FIGS. 2A, 2B).

Further, the first and second charges are executed in such a manner that the residual charge quantity of the battery 14 does not exceed the above-described maximum quantity. That is, the first and second charges are executed so that the total of their respective charge times does not exceed the charge time which is required for the residual charge quantity of the battery becoming the maximum quantity (the maximum-quantity charge time).

Hereinafter, the charge control of the battery charger 18 to the battery 14 (the charge method of the present invention) will be described referring to FIG. 4.

First, in step S100, it is determined whether or not the electric motor vehicle W stops and the battery charger 18 is connected to the outside electric source 20 via the connector 22. When this is determined, the control proceeds to step S110.

In the step S110, the battery charger 18 calculates the SOC of the battery 14 based on the signal from the voltage sensor 24.

In the next step S120, the battery charger 18 obtains the current time tnow. That is, the driving-start time of the electric motor vehicle W is obtained.

Subsequently, in step S130, the battery charger 18 obtains the vehicle-driving start time tds (data) from the driving-start time input device 26.

In the next step S140, the battery charger 18 calculates the charge time Ttotal which is required for the residual charge quantity of the battery 14 becoming the maximum quantity (the maximum-quantity charge time) based on the SOC calculated in the step S110.

In the next step S150, the battery charger 18 determines whether or not the maximum-quantity charge time Ttotal is shorter than the time from the current time tnow which is obtained in the step S120 to the driving-start time tds which is obtained in the step S130. When the maximum-quantity charge time Ttotal is shorter than the above-described time, the control proceeds to step S160.

Meanwhile, when the maximum-quantity charge time Ttotal is the above-described time or longer, the control proceeds to step S290, where the second charge which is to be completed at the vehicle's driving-start time tds is started immediately. Accordingly, the battery 14 is charged continuously during the stop period of the electric motor vehicle W. When the maximum-quantity charge time Ttotal is longer than the time from the current time tnow to the driving-start time tds, the second charge is completed before the residual charge quantity of the battery 14 has become (reached) the maximum quantity at the driving-start time tds. When the maximum-quantity charge time Ttotal is equal to the time from the current time tnow to the driving-start time tds, the residual charge quantity of the battery 14 becomes (reaches) the maximum quantity and at this timing when the second charge is completed.

In the step S160, the battery charger 18 obtains the temperature K (data) at the driving-start time tds from the car navigation device 18.

In step S170, the battery charger 18 calculates the warm-up time Tw which corresponds to the temperature K based on the map of FIG. 3.

In step S180, the battery charger 18 calculates the specified charge time Tb which is required for the residual quality of the battery 14 becoming the specified quantity (SOC 70% of FIGS. 2A and 2B).

In step S190, the battery charger 18 determines whether or not the total of the warm-up time Tw which is calculated in the step S170 and the specified charge time Tb which is calculated in the step S180 exceeds the maximum-quantity charge time Ttotal which is calculated in the step S140.

When the total of the warm-up time Tw and the specified charge time Tb does not exceed the maximum-quantity charge time Ttotal (not including being equal), the execution time of the first charge (the first charge time) T1 is set to a time which is obtained by subtracting the warm-up time Tw from the maximum-quantity charge time Ttotal in the next step S200. Then, the execution time of the second charge (the second charge time) T2 is set to the warm-up time Tw in step S210.

Meanwhile, when the total of the warm-up time Tw and the specified charge time Tb exceeds the maximum-quantity charge time Ttotal (including being equal), the first charge time T1 is set to the time which is obtained by subtracting the warm-up time Tw from the maximum-quantity charge time Ttotal in the next step S220. Then, the second charge time T2 is set to the warm-up time Tw in step S230.

Herein, the steps S200 and S220 have the same processing contents, and the steps S210 and S230 have the same processing contents.

In the steps S210 and S230 the second charge time T2 is set to the same warm-up time T2. That is, regardless of whether or not the total of the warm-up time Tw and the specified charge time Tb exceeds the maximum-quantity charge time Ttotal, the warm-up time Tw is ensured (consequently, the temperature of the battery 14 can be increased to the proper temperature at the driving-start time tds).

Figure 5A:
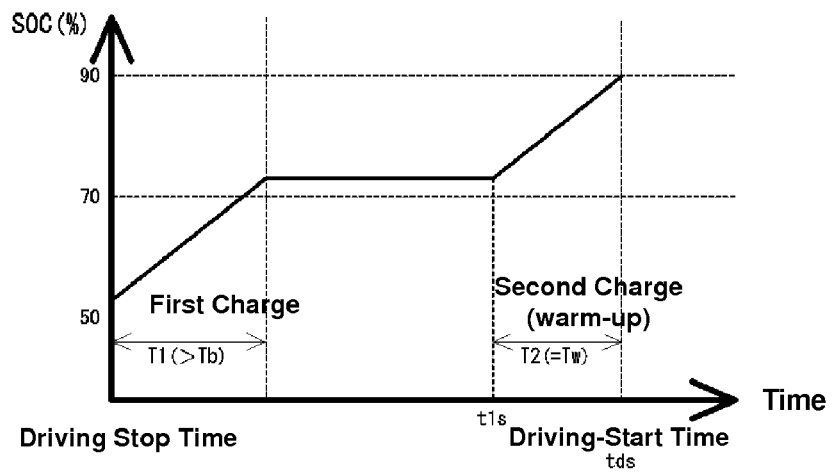
FIGS. 5A, 5B are graphs showing a change of SOC of the battery according to the flowchart of FIG. 4.

Meanwhile, the first charge time T1 which is set in the steps S200 and S220 has different times from each other. The first charge time T1 of the step S200 is set to be longer than the specified charge time Tb. That is, as shown in FIG. 5A, the first charge is completed shortly after the SOC has exceeded the specified quantity (70%). Thus, the charge time of the first charge to prepare for the unscheduled driving before the scheduled driving-start time tds is extended. Accordingly, since the vehicle driving can be started with the maximum residual charge quantity of the battery in case the driving is started at the driving-start time tds on schedule, the long driving can be ensured. Meanwhile, since the first charge is extended, even in case the driving is started unexpectedly before the driving-start time tds sat the start time tds, the driving can be conducted for a sufficiently long period time.

Meanwhile, the first charge time T1 is set to the specified charge time Tb or to be shorter in the step S220. In case the first charge time T1 is equal to the specified charge time Tb, as shown in FIG. 2A, the first charge is completed when the SOC reaches the specified quantity.

Figure 5B:
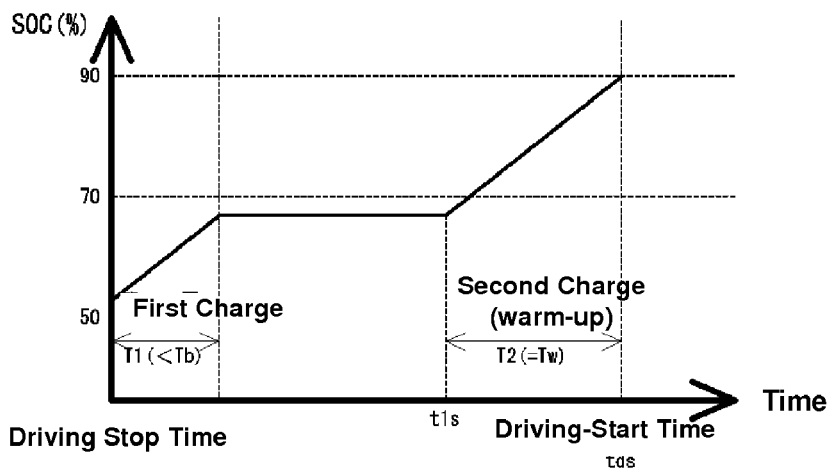

In case the first charge time T1 is shorter than the specified charge time Tb, as shown in FIG. 5B, the first charge is completed before the SOC reaches the specified quantity. That is, the charge time of the first charge to prepare for the unscheduled driving before the scheduled driving-start time tds is shortened. Thus, the excessive charge in which the battery is charged over the maximum quantity can be prevented.

Briefly speaking, the battery charge 18 executes the charge so that the residual battery quantity of the battery 14 can become the maximum quantity at the driving-start time tds and the warm-up of the battery can be given priority to.

Returning to FIG. 4, in step S240, the battery charge 18 calculates the time which is earlier than (advanced from) the driving-start time tds by the second charge time T2, that is, the start time t2s of the second charge.

After the calculation of the start time t2s of the second charge in the step S240, the battery charge 18 starts the first charge in the next step S250.

In step S260, the battery charge 18 determines whether or not the first charge time T1 which has been set in the step S200 or the step S220 has passed from the start of the first charge. When it has passed, the control proceeds to step S270, where the first charge is completed.

After the completion of the first charge, the battery charge 18 determines in step S280 whether or not it is the start time t2s of the second charge which has been calculated in the step S240. When it is the start time t2s, the control proceeds to the next step S290, where the second charge is started.

After the start of the second charge, the battery charge 18 determines in step S300 whether or not it is the driving-start time tds. When it is the driving-start time tds, the control proceeds to the next step S310, where the second charge is completed. Thus, the charging using the outside electric source 20 during the stop of the electric motor vehicle W is finished.

According to the present embodiment, the warm-up of the battery 14 of the electric motor vehicle W can be completed (the temperature of the battery 14 can be increased up to the proper temperature) by the scheduled driving-start time tds, so that the vehicle driving can be started promptly even in the cold season. Further, in case the driver wants the unscheduled driving before the scheduled driving-start time tds, the battery 14 may keep its sufficient residual charge quantity (almost the specified quantity), so that the vehicle's driving start and the subsequent long driving can be ensured.

Further, since the warm-up of the battery 14 (the second charge) is conducted depending on the temperature K at the driving-start time tds, the temperature of the battery 14 at the vehicle's driving start time tds can be warmed up to the proper temperature.

Moreover, in case the unscheduled driving start is conducted before the scheduled driving-start time tds, the driving for a period of time which corresponds to the specified charge time (the first charge time T1) can be ensured.

Figure 4:
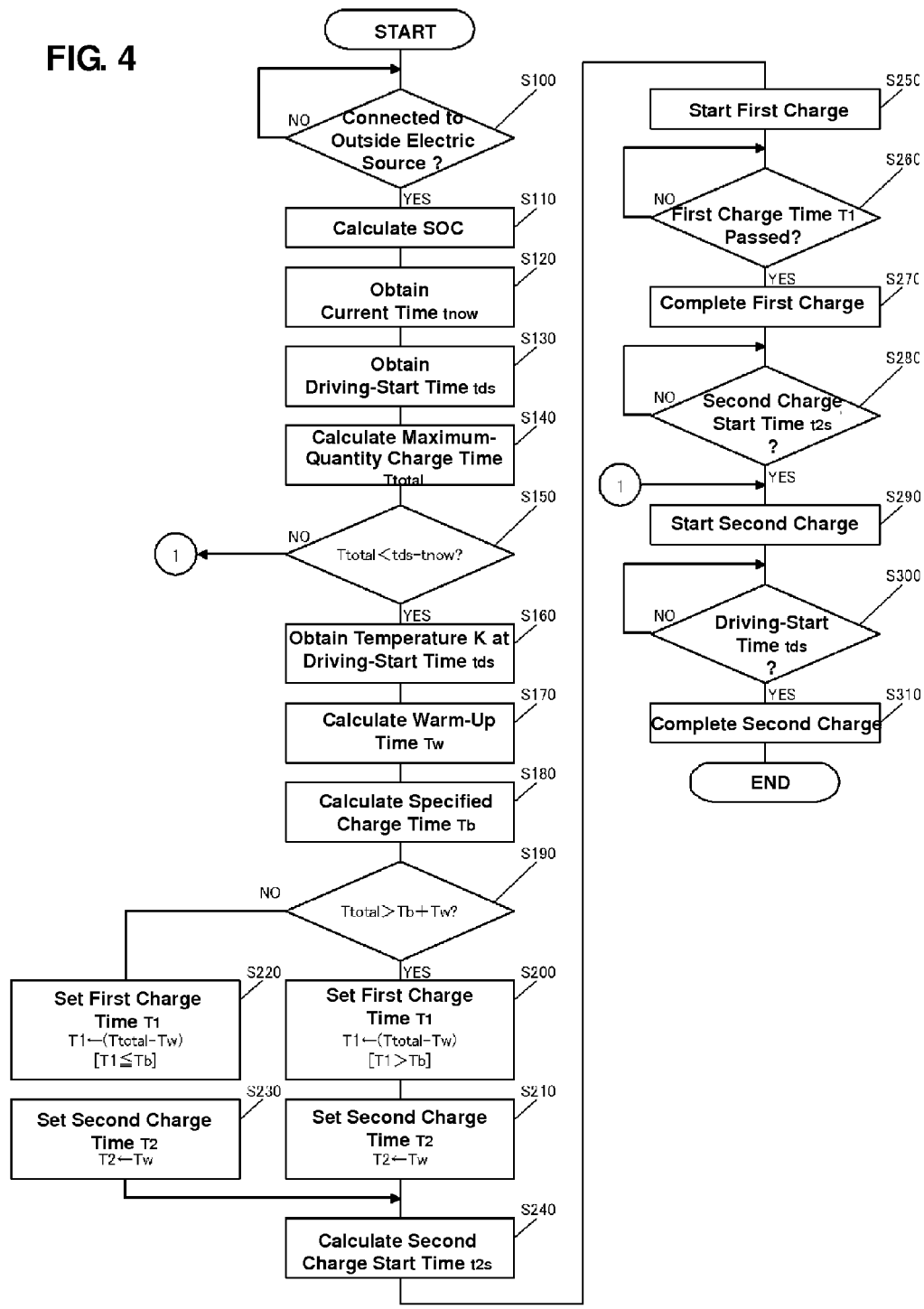
FIG. 4 is a flowchart of a charge of a first embodiment.
Figure 6:
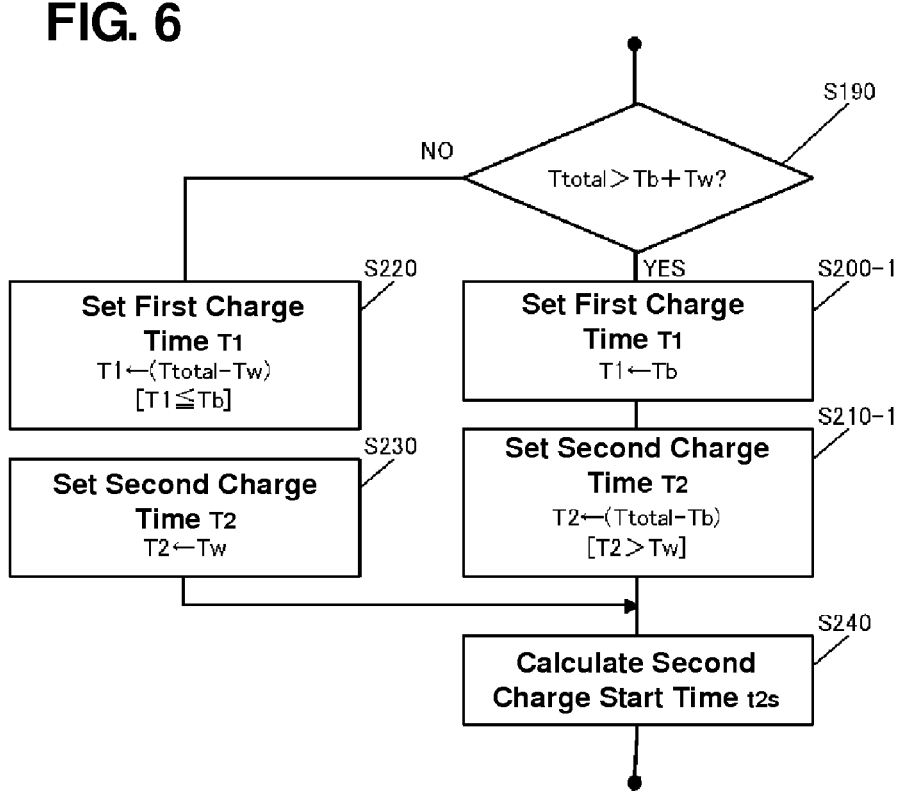
FIG. 6 is a part of a flowchart of a first modification of the first embodiment.

Herein, the above-described steps S200 and S220 of FIG. 4 may be replaced by steps S200-1 and S210-1 of FIG. 6 as a first modification of the above-described first embodiment. This modification also enables the completion of the warm-up of the battery 14 by the scheduled driving-start time, that is, the charge can be executed so that the warm-up of the battery is given priority to.

Hereinafter, the first modification will be described specifically. The battery charger 18 sets the first charge time T1 to the specified charge time Tb in the step S200-1, and sets the second charge time T2 to the time which is obtained by subtracting the specified charge time Tb from the maximum-quantity charge time Ttotal in the step S210-1. Thus, the second charge time T2 is set to the time which is longer than the warm-up time Tw. That is, the charge time of the second charge to complete the warm-up of the battery at the scheduled driving-start time tds is extended. Accordingly, since the vehicle driving can be started with the maximum residual charge quantity of the battery 14 in case the driving is started at the driving-start time tds on schedule, the long driving can be ensured. Further, since the start timing of the second charge becomes earlier, the temperature of the battery 14 can be increased up to the proper temperature at the early stage. Thereby, even in case the driving start is earlier than the scheduled start-time tds, the prompt driving start can be ensured.

EMBODIMENT 2

In the above-described first embodiment, the temperature of the battery 14 decreases during the period of time from the completion time of the first charge to the start time of the second charge as shown in FIG. 2B. In some case the battery's temperature may reduce to the outside temperature. Accordingly, there is a concern that in case the driving start is tried unexpectedly during this period, the temperature of the battery 14 is so cold that the prompt driving start may not be achieved.

Figure 7:
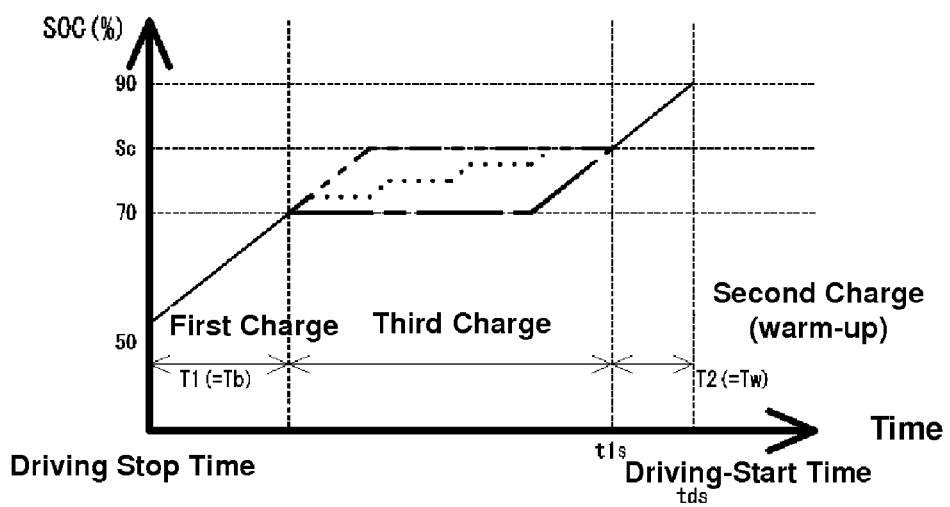
FIG. 7 is a graph showing a change of SOC of the battery according to a second embodiment.

In a second embodiment, the battery charger 18 executes the first charge and the second charge, and additionally a third charge between the first and second charges as shown in FIG. 7 to cope with the above-described concern.

There may be some types of manners regarding the third charge. One of them shows the change of the SOC which is illustrated by a one-dotted broken line in FIG. 7. The third charge functions so as to be continuous to the second charge. Another one shows the change of the SOC which is illustrated by a two-dotted broken line in FIG. 7, in which the third charge starts continuously from the first charge and reaches to the SOC of Sc. Herein, Sc is the state of charge at the point where the second charge is started, and it is calculated by subtracting an increase due to only the charge with the warm-up time Tw from the maximum quantity. Further another one shows the change of the SOC which is illustrated by a broken line in FIG. 7, in which the third charge comprises plural stepwise charging.

The charge control of the battery charger 18 for the battery 14 in case the third charge is executed will be described referring to a flowchart of FIG. 8.

Figure 8:
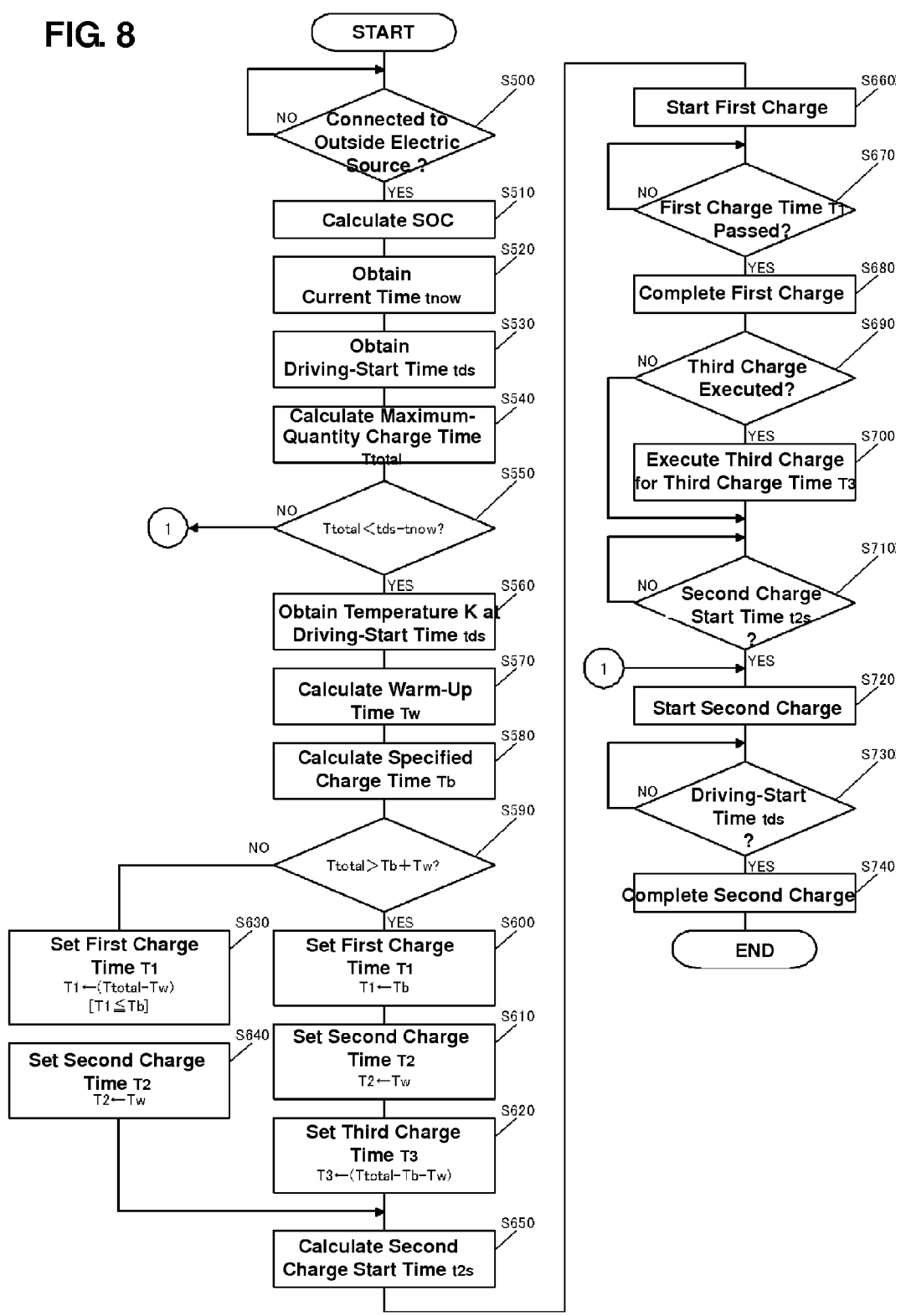
FIG. 8 is a flowchart of a charge of the second embodiment.

Steps S500-S590 of FIG. 8 are the same as the steps S100-S190 of FIG. 4 of the first embodiment, so their descriptions are omitted.

When the total of the warm-up time Tw and the specified charge time Tb does not exceed the maximum-quantity charge time Ttotal (not including being equal), the battery charger 18 sets the first charge time T1 to the specified charge time Tb in step S600, and sets the second charge time T2 to the warm-up time Tw in step S610.

In the next step S620, the battery charger 18 sets the execution time of the third charge (the third charge time) T3 to a time which is obtained by subtracting the specified charge time Tb and the warm-up time Tw from the maximum-quantity charge time Ttotal.

Steps S630-S680 are the same as the steps S220-S270 of FIG. 4 of the first embodiment, so their descriptions are omitted.

When the first charge is completed, the battery charger 18 determines in step S690 whether the third charge is executed or not. That is, it is determined whether the steps S600-S620 are executed or not. In case the third charge is executed, the control proceeds to step S700. In case the third charge is not executed, the control proceeds to step S710.

In the step S700, the battery charger 18 executes the third charge for the third charge time T3 which is calculated in the step S620 as shown in FIG. 7. Then, the control proceeds to step S710.

Steps S710-S740 are the same as the steps S280-S310 of FIG. 4 of the first embodiment, so their descriptions are omitted.

According to the present embodiment, in case the total of the charge time of the first charge (the first charge time) T1 and the charge time of the second charge (the second charge time) T2 does not exceed the maximum-quantity charge time, the third charge is executed for the third charge time T3 between the first charge and the second charge. Thereby, even in case the unscheduled driving start is conducted between the completion time of the first charge and the start time of the second charge, the battery 14 is warmed up by the third charge, so that the prompt driving start can be ensured.

The present invention should not be limited to the above-described embodiments. For example, while the driving-start time of the electric motor vehicle W is the one which the driver inputs to the driving-start time input device 26 in the above-described embodiments, driving states of the eclectic motor vehicle by the driver may be memorized as driving histories at a memory means and the driving-start time may be estimated based on the driving histories.

Further, while the temperature (data) at the driving-start time is provided by the car navigation device in the above-described embodiments, this provision may be executed by the driver searching the temperature at the driving-start time and inputting this temperature along with the driving-start time via an input means. Or, there may be provided a temperature record means for recording both the temperature and the time when the driving is started and the temperature at the driving-start time may be estimated based on this recorded information.

Moreover, while the warm-up of the battery is given priority to in the above-described embodiment, in case the severe warm-up is not necessary, for example, even in the cold season, when the temperature of the battery does not decrease so much, the charging may be executed so as to give priority to the preparation for unscheduled driving before the scheduled driving-start time instead of the warm-up.

Figure 9:
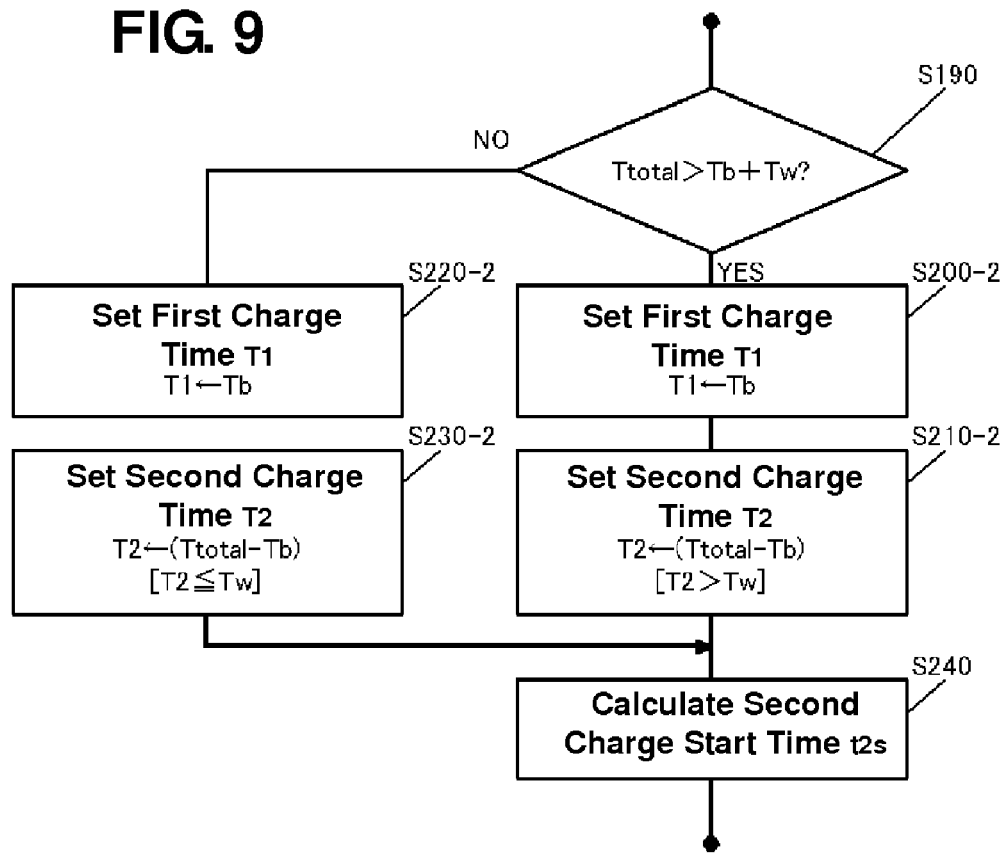
FIG. 9 is a part of a flowchart of a second modification of the first embodiment.

In this case, the steps S200-S230 of FIG. 4 are replaced by steps S200-2 through S230-2 of FIG. 9.

Hereinafter, this second modification of the first embodiment will be described. When the total of the warm-up time Tw and the specified charge time Tb does not exceed the maximum-quantity charge time Ttotal (not including being equal), the execution time of the first charge (the first charge time) T1 is set to the specified charge time Tb in the step S200-2, and the second charge time T2 is set to the time which is obtained by subtracting the specified charge time Tb from the maximum-quantity charge time Ttotal in the step S210-2. These are the same as the steps S200-1 and S210-1 of FIG. 6.

Meanwhile, when the total of the warm-up time Tw and the specified charge time Tb exceeds the maximum-quantity charge time Ttotal (including being equal), the first charge time T1 is set to the specified charge time Tb in the step S220-2, and the second charge time T2 is set to the time which is obtained by subtracting the specified charge time Tb from the maximum-quantity charge time Ttotal in the step S230-2.

Figure 10A:
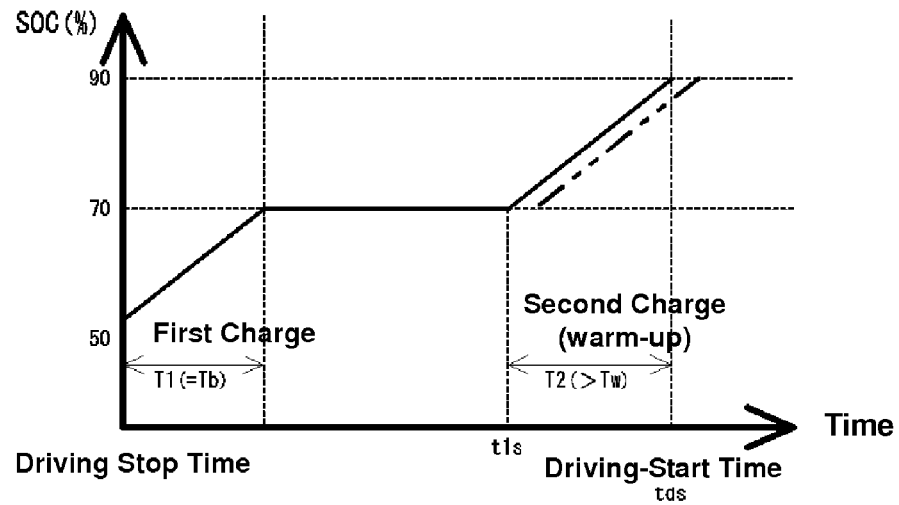
FIGS. 10A, 10B are graphs showing a change of SOC of the battery according to the flowchart of FIG. 9.
Figure 10B:
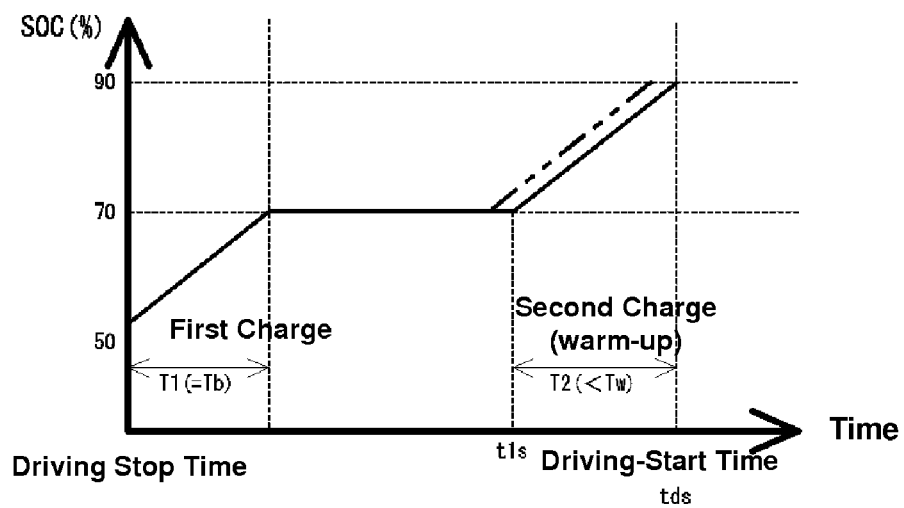

According to this, as shown in FIGS. 10A and 10B, in both cases in which the total of the warm-up time Tw and the specified charge time Tb does not exceed the maximum-quantity charge time Ttotal (FIG. 10B) and in which the total of the warm-up time Tw and the specified charge time Tb exceeds the maximum-quantity charge time Ttotal (FIG. 10A), the first charge is executed only for the specified charge time Tb.

Meanwhile, when the total of the warm-up time Tw and the specified charge time Tb does not exceed the maximum-quantity charge time Ttotal, the second charge time T2 is set to the time which is longer than the warm-up time Tw as shown in FIG. 10A. A two-dotted broken line in this figure shows the change of the SOC when the second charge time T2 is equal to the warm-up time Tw.

On the contrary, when the total of the warm-up time Tw and the specified charge time Tb exceeds the maximum-quantity charge time Ttotal, the second charge time T2 is set to the time which is shorter than the warm-up time Tw as shown in FIG. 10B, or the time which is equal to the warm-up time Tw as shown in FIG. 2A. A two-dotted broken line in the figure shows the change of the SOC when the second charge time T2 is equal to the warm-up time Tw.

Accordingly, in case the first charge is executed only for the specified charge time Tb and the unscheduled driving is started before the scheduled driving-start time tds, the driving can be continued for the driving time which corresponds to the specified charge time Tb. Further, the charge time of the second charge (the second charge time) is shortened so that the residual battery quantity does not exceed the maximum quantity as shown in FIG. 10B, so that the improper excessive charge of the battery can be prevented.

Figure 11:
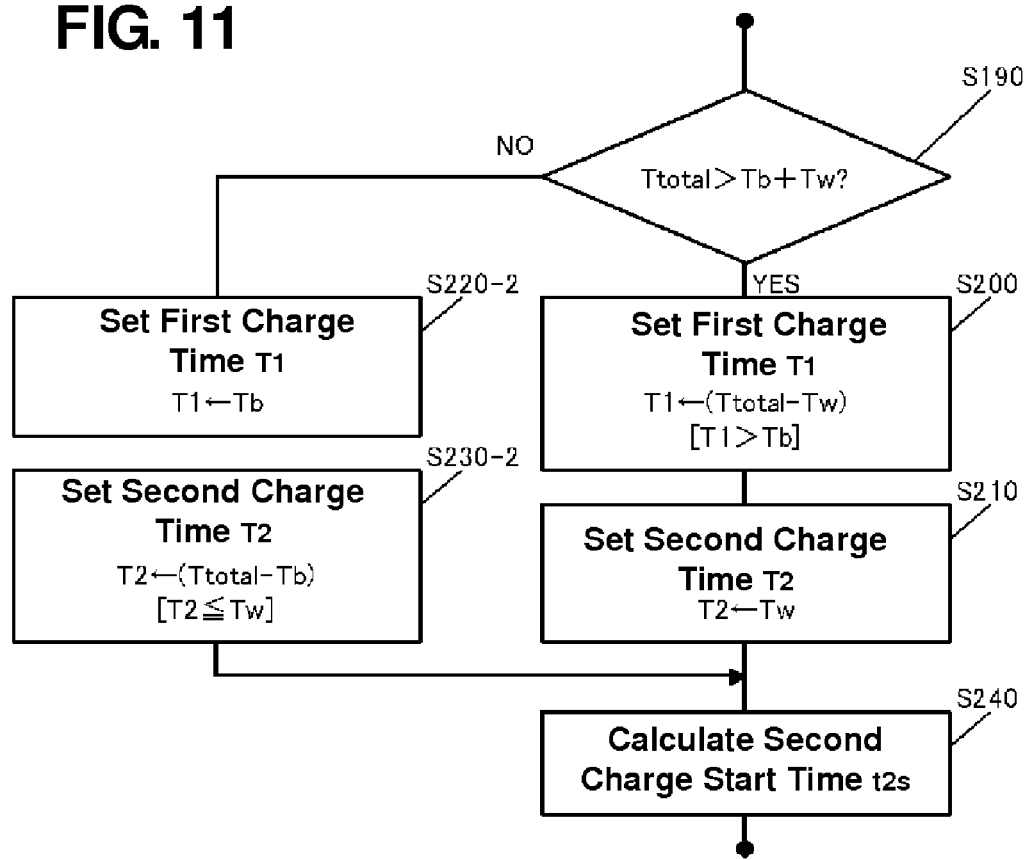
FIG. 11 is a part of a flow chart of a third modification of the first embodiment.

Moreover, the steps S200-2 and S210-2 of FIG. 9 may be replaced by the steps S200 and S210 of FIG. 4 as shown in FIG. 11. This third modification of the first embodiment also can provide the charge to give priority to the preparation for unscheduled driving before the scheduled driving-start time.

Briefly speaking, according to the present invention, the first charge is started at the vehicle-driving stop of the electric motor vehicle, continued for the period of time which is shorter than the maximum-quantity charge time, and completed before the scheduled driving-start time. Additionally, the second charge which is to be completed at the driving-start time is executed after the completion of the first charge. That is, the first charge is not executed for the maximum-quantity charge time so that the second charge can be executed so as to provide the sufficient warm-up at the vehicle's driving-start time.

What is claimed is:

1. A charge method of a battery for an electric motor vehicle, in which a battery is charged by an outside electric source, comprising:
   a residual charge quantity detecting step for detecting a residual charge quantity of the battery before charging;
   a maximum-quantity charge time calculating step for calculating a maximum-quantity charge time which is required for the residual charge quantity of the battery becoming the maximum quantity based on detection result of said residual charge quantity detecting step;
   a driving-start time estimating step for estimating a driving-start time of the electric motor vehicle;
   a first charge step for executing a first charge in which the charge of the battery is started from a driving stop of the electric motor vehicle, continued for a specified period of charge time which is shorter than the maximum-quantity charge time calculated by said maximum-quantity charge time calculating step, and completed before the driving-start time of the electric motor vehicle estimated by said driving-start time estimating step; and
   a second charge step for executing a second charge in which the charge of the battery is started after said first charge step is completed and completed at the driving-start time of the electric motor vehicle estimated by said driving-start time estimating step.

2. The charge method of a battery for an electric motor vehicle of claim 1, further comprising a temperature estimating step for estimating a temperature at the driving-start time of the electric motor vehicle estimated by said driving-start time estimating step, and a warm-up time calculating step for calculating a warm-up time for the battery based on estimation result of said temperature estimating step, wherein said second charge step is executed for a period of the warm-up time calculated by said warm-up time calculating step.

3. The charge method of a battery for an electric motor vehicle of claim 2, wherein said specified period of charge time of the first charge which is executed by said first charge step is a specified charge time which is required for the residual charge quantity of the battery becoming a specified quantity.

4. The charge method of a battery for an electric motor vehicle of claim 3, wherein in case a total of respective charge times of the first and second charges which are executed by said first and second charge steps exceeds the maximum-quantity charge time calculated by said maximum-quantity charge time calculating step, the period of charge time of the first charge which is executed by said first charge step is shortened such that said total of the charge times of the first and second charges is equal to the maximum-quantity charge time calculated by the maximum-quantity charge time calculating step.

5. The charge method of a battery for an electric motor vehicle of claim 3, wherein in case a total of respective charge times of the first and second charges which are executed by said first and second charge steps exceeds the maximum-quantity charge time calculated by said maximum-quantity charge time calculating step, the period of charge time of the second charge which is executed by said second charge step is shortened such that said total of the charge times of the first and second charges is equal to the maximum-quantity charge time calculated by the maximum-quantity charge time calculating step.

6. The charge method of a battery for an electric motor vehicle of claim 3, wherein in case a total of respective charge times of the first and second charges which are executed by said first and second charge steps does not exceed the maximum-quantity charge time calculated by said maximum-quantity charge time calculating step, the period of charge time of the first charge which is executed by said first charge step is extended such that said total of the charge times of the first and second charges is equal to the maximum-quantity charge time calculated by the maximum-quantity charge time calculating step.

7. The charge method of a battery for an electric motor vehicle of claim 3, wherein in case a total of respective charge times of the first and second charges which are executed by said first and second charge steps does not exceed the maximum-quantity charge time calculated by said maximum-quantity charge time calculating step, the period of charge time of the second charge which is executed by said second charge step is extended such that said total of the charge times of the first and second charges is equal to the maximum-quantity charge time calculated by the maximum-quantity charge time calculating step.

8. The charge method of a battery for an electric motor vehicle of claim 3, further comprising a third charge step for executing a third charge in which the charge of the battery is conducted for a specified period of charge time in case a total of respective charge times of the first and second charges which are executed by said first and second charge steps does not exceed the maximum-quantity charge time calculated by said maximum-quantity charge time calculating step, wherein said third charge step is conducted after said first charge step and before said second charge step such that the charge time of the third charge is equivalent to a difference between the total of the charge times of the first and second charges and the maximum-quantity charge time.

9. A charge device of a battery for an electric motor vehicle, comprising:
a battery to be charged by an outside electric source and supply an electric power to a motor for driving the vehicle;
a residual charge quantity detecting means for detecting a residual charge quantity of the battery before charging; and
a charge control means for controlling charging of said battery,
wherein said charge control means calculates a maximum-quantity charge time which is required for the residual charge quantity of the battery becoming the maximum quantity based on detection result of said residual charge quantity detecting means, estimates a driving-start time of the electric motor vehicle, executes a first charge in which the charge of the battery is started from a driving stop of the electric motor vehicle, continued for a specified period of charge time which is shorter than the maximum-quantity charge time, and completed before the driving-start time of the electric motor vehicle, and executes a second charge in which the charge of the battery is started after the first charge is completed and completed at the driving-start time of the electric motor vehicle.

10. The charge device of a battery for an electric motor vehicle of claim 9, further comprising a temperature estimating means for estimating a temperature at the driving-start time of the electric motor vehicle, wherein said charge control means calculates a warm-up time for the battery based on estimation result of said temperature estimating means, and executes the second charge for a period of said calculated warm-up time.

11. The charge device of a battery for an electric motor vehicle of claim 10, wherein said charge control means calculates a specified charge time which is required for the residual charge quantity of the battery becoming a specified quantity, and executes the first charge for a period of said calculated specified charge time.

12. The charge device of a battery for an electric motor vehicle of claim 11, wherein said charge control means determines whether or not a total of respective charge times of the first and second charges which are executed exceeds said calculated maximum-quantity charge time, and shortens the period of charge time of the first charge such that the total of the charge times of the first and second charges is equal to the maximum-quantity charge time in case the total of the charge times of the first and second charges exceeds the maximum-quantity charge time.

13. The charge device of a battery for an electric motor vehicle of claim 11, wherein said charge control means determines whether or not a total of respective charge times of the first and second charges which are executed exceeds said calculated maximum-quantity charge time, and shortens the period of charge time of the second charge such that the total of the charge times of the first and second charges is equal to the maximum-quantity charge time in case the total of the charge times of the first and second charges exceeds the maximum-quantity charge time.

14. The charge device of a battery for an electric motor vehicle of claim 11, wherein said charge control means determines whether or not a total of respective charge times of the first and second charges which are executed exceeds said calculated maximum-quantity charge time, and extends the period of charge time of the first charge such that the total of the charge times of the first and second charges is equal to the maximum-quantity charge time in case the total of the charge times of the first and second charges does not exceed the maximum-quantity charge time.

15. The charge device of a battery for an electric motor vehicle of claim 11, wherein said charge control means determines whether or not a total of respective charge times of the first and second charges which are executed exceeds said calculated maximum-quantity charge time, and extends the period of charge time of the second charge such that the total of the charge times of the first and second charges is equal to the maximum-quantity charge time in case the total of the charge times of the first and second charges does not exceed the maximum-quantity charge time.

16. The charge device of a battery for an electric motor vehicle of claim 11, wherein said charge control means determines whether or not a total of respective charge times of the first and second charges which are executed exceeds said calculated maximum-quantity charge time, and executes a third charge in which the charge of the battery is conducted for a specified period of charge time in case the total of the charge times of the first and second charges does not exceed the maximum-quantity charge time, the third charge being conducted after the first charge and before the second charge such that the charge time of the third charge is equivalent to a difference between the total of the charge times of the first and second charges and the maximum-quantity charge time.

* * * * *